(12) United States Patent
Kohn et al.

(10) Patent No.: US 9,325,785 B2
(45) Date of Patent: Apr. 26, 2016

(54) DEVICE, SYSTEM, AND METHOD FOR CLIENT-GOVERNED SESSION PERSISTENCY BETWEEN ONE OR MORE CLIENTS AND SERVERS OF A DATA CENTER

(76) Inventors: Rodolfo Kohn, Cordoba (AR); Munir Ghamrawi, Hillsboro, OR (US); Sridhar Mahankali, Beaverton, OR (US)

( * ) Notice: Subject to any disclaimer, the term of this patent is extended or adjusted under 35 U.S.C. 154(b) by 106 days.

(21) Appl. No.: 13/538,118

(22) Filed: Jun. 29, 2012

(65) Prior Publication Data

US 2014/0006578 A1    Jan. 2, 2014

(51) Int. Cl.
*G06F 15/173*    (2006.01)
*H04L 29/08*    (2006.01)

(52) U.S. Cl.
CPC ........ *H04L 67/1027* (2013.01); *H04L 67/1029* (2013.01); *H04L 67/1031* (2013.01); *G06F 2212/7202* (2013.01); *G06F 2221/2141* (2013.01)

(58) Field of Classification Search
CPC ................ G06F 2212/7202; G06F 2221/2241
USPC ........................................................ 709/223
See application file for complete search history.

(56) References Cited

U.S. PATENT DOCUMENTS

| | | | |
|---|---|---|---|
| 6,578,006 B1 | 6/2003 | Saito et al. | |
| 7,003,574 B1 * | 2/2006 | Bahl | 709/228 |
| 7,296,076 B1 | 11/2007 | Portolani | |
| 7,954,144 B1 * | 5/2011 | Ebrahimi et al. | 726/12 |
| 2007/0005786 A1 * | 1/2007 | Kumar et al. | 709/230 |
| 2009/0113055 A1 * | 4/2009 | Cicchino et al. | 709/226 |
| 2010/0241715 A1 * | 9/2010 | Takase | H04L 67/24 709/206 |

FOREIGN PATENT DOCUMENTS

| | | |
|---|---|---|
| EP | 0926608 B1 | 3/2004 |
| WO | 2014004308 A1 | 1/2014 |

OTHER PUBLICATIONS

International Search Report and Written Opinion received for International Application No. PCT/US2013/047088, mailed on Sep. 30, 2013, 9 pages.
"Load balancing (computing)," Wikipedia, The Free Encyclopedia, retrieved from <http://en.wikipedia.org/w/index.php?title=Load_balancing_(computing)&oldid=464260975>, edited Dec. 5, 2011, 5 pages.

* cited by examiner

*Primary Examiner* — Yves Dalencourt
(74) *Attorney, Agent, or Firm* — Barnes & Thornburg LLP (57) ABSTRACT

A device, system, and method for maintaining session persistency between one or more clients and one or more data servers includes providing a persistent session between the client(s) and data server(s) as a function of a load balancer hint header included in a message received by the load balancer from the client(s). The client(s) modifies the message, which may be generated by an application, to include the load balancer hint header that identifies a location, within the message, of a session ID that identifies the particular persistent session. The load balancer identifies the data server(s) from a session-server table based on the session ID and transmits the message to the identified data server(s). The load balancer may communicate with other load balancers, if the load balancer is unable to locate the corresponding data server, to determine the location of the corresponding data server(s).

30 Claims, 6 Drawing Sheets

DEVICE, SYSTEM, AND METHOD FOR CLIENT-GOVERNED SESSION PERSISTENCY BETWEEN ONE OR MORE CLIENTS AND SERVERS OF A DATA CENTER

BACKGROUND

Cloud computing is a ubiquitous tool by which virtual computing resources and services are provided to companies and other entities. Cloud computing can offer many advantages to a client company including relatively quick, efficient, and inexpensive upgradability and scalability of computing resources as the needs of the client company changes over time. In cloud computing, infrastructure, platform, and/or software may be provided by a cloud computing provider to the client company as a "service" over a network (i.e., over the "cloud"). For example, rather than having independent software packages loaded on each of the client company's computers, the software may be provided to the client company as a service accessible by any of the client company's computers using a web browser or associated lightweight application.

The cloud computing provider typically manages one or more data centers, which facilitate access to computing resources and services by the client company. Each data center may include one or more data servers (e.g., web servers, application servers, etc.) and one or more load balancers to balance the workload from the client company computers across the data servers using a load balancing algorithm (or one or more "global load balancers" to balance the workload across the data centers). As the computing needs of the client company grows, additional data servers and/or data centers may be added to the company's cloud computing resources to satisfy the increased computing needs. To support multiple, contemporaneous access to the virtual computing resources and services by the company client computers, each data server may include a local copy of data used by the computing resources/services. To ensure each data server has access to a complete copy of the stored data, the data is periodically replicated across the data servers.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
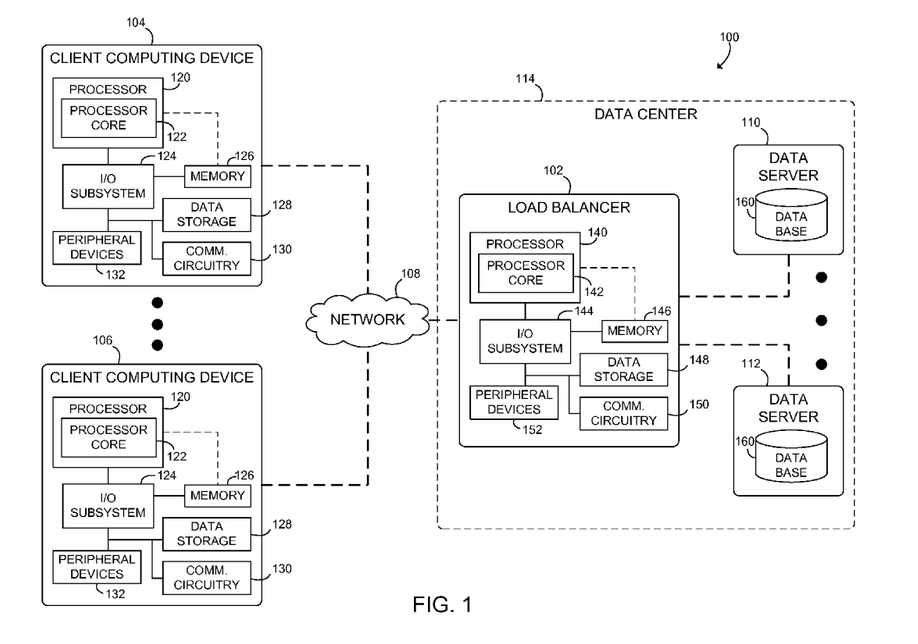
FIG. 1 is a simplified block diagram of at least one embodiment of a system for maintaining session persistency between a client computing device and a data server of a data center.

Referring now to FIG. 1, in one embodiment, a system 100 for maintaining session persistency between a client and one or more data servers comprises a load balancer 102 configured to receive messages from one or more client computing devices 104, 106 over a network 108 and forward such messages to a selected one or more data servers 110, 112 of a data center 114. To do so, as discussed in more detail below, the client computing device 104, 106 is configured to modify particular outgoing messages to include a load balancer hint header that identifies a location within the message at which a session identifier (ID) is located. The load balancer 102 recognizes such messages based on presence of the load balancer hint header and retrieves the session ID from the message based on the data included in the load balancer hint header. The load balancer 102 maintains a session-server table that correlates the session ID to one or more particular data servers 110, 112. As such, the load balancer 102 may maintain a persistent session between one or more particular client computing devices 104, 106 and one or more particular data servers 110, 112 by referencing the session-server table to determine the appropriate data server(s) 110, 112 to receive the message. Once determined, the load balancer 102 forwards the message to the appropriate data server(s) 110, 112. In this way, eventual consistency-derived problems are substantially avoided and session persistency is maintained between the one or more client computing devices 104, 106 and one or more data servers 110, 112 by the load balancer 102 as a function of the modified messages sent by the client computing device(s) 104, 106.

Conversely, in a typical cloud computing system, eventual consistency-related problems can be difficult to avoid. For example, a typical cloud computing system arranged as shown in FIG. 1 may exhibit a read-after-write problem under certain conditions. Such condition may occur, for example, when a client computing device writes new data to one data server (i.e., the associated load balancer routes the write message to a first data server) and subsequently reads data from a different data server (i.e., the associated load balancer routes the read message to a second data server) that has not been updated via replication yet. Such a read-after-write problem occurs due to the temporal delay of data server replication across the cloud computing system.

Some cloud computing systems attempt to alleviate the read-after-write problem and ensure eventual consistency by using cookies or data additional to, and separate from, the messages being sent by the client computing devices. The use of such cookies or additional, separate data messages can increase the overhead and latency of the cloud computing systems. Other cloud computing systems may embed data in the message body, which is used to establish a "sticky session" as is known in the art. However, such systems require the load balancer to parse every received message body to scan for the embedded stickiness data. Such parsing and scanning can significantly affect load balancer performance because the load balancer has no indication where in the message such stickiness data is located and, as such, must search the entire message, or a significant portion thereof, to locate the stickiness data.

Referring back to FIG. 1, each of the client computing devices 104, 106 of the system 100 may be embodied as any type of computing device capable of performing the functions described herein. For example, each of the client computing devices 104, 106 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data in the data center 114. In some embodiments, one or more of the computing devices 104, 106 may be embodied as a server (e.g., a customer web portal or data server, which acts as a client to the data center 114). Additionally, although the system 100 is illustrated in FIG. 1 as including two client computing devices 104, 106, it should be appreciated that the system 100 may include additional client computing devices in other embodiments.

In the illustrative embodiment of FIG. 1, the client computing device 104 includes a processor 120, an I/O subsystem 124, a memory 126, a data storage 128, a communication circuitry 130, and one or more peripheral devices 132. In some embodiments, several of the foregoing components may be incorporated on a motherboard or main board of the client computing device 104, while other components may be communicatively coupled to the motherboard via, for example, a peripheral port. Furthermore, it should be appreciated that the client computing device 104 may include other components, sub-components, and devices commonly found in a computer and/or computing device, which are not illustrated in FIG. 1 for clarity of the description.

The processor 120 of the client computing device 104 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the client computing device 104 may include additional processors 120 having one or more processor cores 122.

The I/O subsystem 124 of the client computing device 104 may be embodied as circuitry and/or components to facilitate input/output operations with the processor 120 and/or other components of the client computing device 104. In some embodiments, the I/O subsystem 124 may be embodied as a memory controller hub (MCH or "northbridge"), an input/output controller hub (ICH or "southbridge"), and a firmware device. In such embodiments, the firmware device of the I/O subsystem 124 may be embodied as a memory device for storing Basic Input/Output System (BIOS) data and/or instructions and/or other information (e.g., a BIOS driver used during booting of the client computing device 104). However, in other embodiments, I/O subsystems having other configurations may be used. For example, in some embodiments, the I/O subsystem 124 may be embodied as a platform controller hub (PCH). In such embodiments, the memory controller hub (MCH) may be incorporated in or otherwise associated with the processor 120, and the processor 120 may communicate directly with the memory 126 (as shown by the hashed line in FIG. 1). Additionally, in other embodiments, the I/O subsystem 124 may form a portion of a system-on-a-chip (SoC) and be incorporated, along with the processor 120 and other components of the client computing device 104, on a single integrated circuit chip.

The processor 120 is communicatively coupled to the I/O subsystem 124 via a number of signal paths. These signal paths (and other signal paths illustrated in FIG. 1) may be embodied as any type of signal paths capable of facilitating communication between the components of the client computing device 104. For example, the signal paths may be embodied as any number of point-to-point links, wires, cables, light guides, printed circuit board traces, vias, bus, intervening devices, and/or the like.

The memory 126 of the client computing device 104 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 126 is communicatively coupled to the I/O subsystem 124 via a number of signal paths. Although only a single memory device 126 is illustrated in FIG. 1, the client computing device 104 may include additional memory devices in other embodiments. Various data and software may be stored in the memory 126. For example, one or more operating systems, applications, programs, libraries, and drivers that make up the software stack executed by the processor 120 may reside in memory 126 during execution.

The data storage 128 may be embodied as any type of device or devices configured for the short-term or long-term storage of data such as, for example, memory devices and circuits, memory cards, hard disk drives, solid-state drives, or other data storage devices. In the illustrative embodiment, the client computing device 104 maintains a message policy database 206 (see FIG. 2) stored in the data storage 128. As discussed in more detail below, the message policy database 206 includes policies or rules for determining which outgoing messages are persistent messages and, as such, should be modified to include the load balancer hint header. Of course, the client computing device 104 may store, access, and/or maintain other data in the data storage 128 in other embodiments.

The communication circuitry 130 of the client computing device 104 may include any number of devices and circuitry for enabling communications between the client computing device 104 and the load balancer 102 over the network 108 as discussed in more detail below. The communication circuitry 130 may be configured to use any one or more, or combination thereof, communication protocols to communicate with the load balancer 102 such as, for example, a wired network communication protocol (e.g., TCP/IP), a wireless network communication protocol (e.g., Wi-Fi®, WiMAX), a cellular communication protocol (e.g., Wideband Code Division Multiple Access (W-CDMA)), and/or other communication protocols.

In some embodiments, the client computing device 104 may also include one or more peripheral devices 132. Such peripheral devices 132 may include any number of additional input/output devices, interface devices, and/or other peripheral devices. For example, in some embodiments, the peripheral devices 132 may include a display, graphics circuitry, keyboard, mouse, speaker system, and/or other input/output devices, interface devices, and/or peripheral devices.

The client computing device 106 may be substantially similar to the client computing device 104 and include similar components, which have been identified in FIG. 1 with common reference numbers. As such, the description provided above of the components of the client computing device 104 may be equally applicable to those similar components of the client computing device 106 and are not repeated herein so as not to obscure the present disclosure. Of course, it should be appreciated that in some embodiments the client computing devices 104, 106 (or other client computing devices of the system 100) may be dissimilar to each other. For example, the client computing devices of system 100 may be embodied as various types of computing devices different from each other (e.g., a desktop computer, a mobile computer, a tablet computer, a smart phone, or other computing device) and include components typically found in such corresponding computing devices.

As discussed in more detail below, the client computing devices 104, 106 are configured to transmit messages to the load balancer 102 of the data center 114 over the network 108. The network 108 may be embodied as any number of various wired and/or wireless networks. For example, the network 108 may be embodied as or otherwise include a wired or wireless local area network (LAN), a wired or wireless wide area network (WAN), and/or a publicly-accessible, global network such as the Internet. As such, the network 108 may include any number of additional devices, such as additional computers, routers, and switches, to facilitate communications between the client computing devices 104, 106 and the load balancer 102 of the data center 114.

Figure 7:
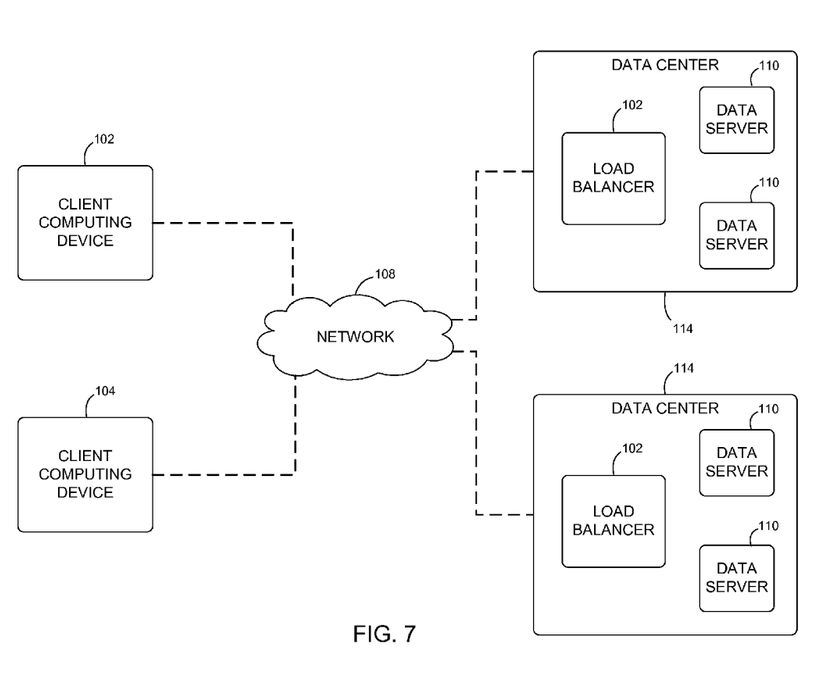
FIG. 7 is a simplified block diagram of another embodiment of a system for maintaining session persistency between a client computing device and a data server of a data center.

As discussed above, the data center 114 includes the load balancer 102 and one or more data servers 110, 112. The load balancer 102 is configured to receive messages from the client computing devices 104, 106 and route such messages to one (or more) of the data servers 110, 112. If a received message is a persistent message (i.e., the message includes a load balancer hint header), the load balancer 102 is configured to retrieve a session ID, which identifies the particular message session, from the message as a function of the load balancer hint header and determine which data server(s) 110, 112 to route the persistent message based on the retrieved session ID as discussed in more detail below. Although the data center 114 is shown in FIG. 1 as including only a single load balancer 102 and data servers 110, 112, it should be appreciated that, in other embodiments, the data center 114 may include additional load balancers and one, two, or more data servers communicatively coupled to each load balancer. Additionally, as shown in FIG. 7, the system 100 may include multiple data centers 114 in some embodiments.

The load balancer 102 may be embodied as any type of data server or similar computing device capable of performing the functions described herein. In the illustrative embodiment of FIG. 1, the load balancer 102 includes a processor 140, an I/O subsystem 144, a memory 146, a data storage 148, a communication circuitry 150, and one or more peripheral devices 152. In some embodiments, several of the foregoing components may be incorporated on a motherboard or main board of the load balancer 102, while other components may be communicatively coupled to the motherboard via, for example, a peripheral port. Furthermore, it should be appreciated that the load balancer 102 may include other components, sub-components, and devices commonly found in a sever and/or computing device, which are not illustrated in FIG. 1 for clarity of the description.

The processor 140 of the load balancer 102 may be embodied as any type of processor capable of executing software/firmware, such as a microprocessor, digital signal processor, microcontroller, or the like. The processor 140 is illustratively embodied as a single core processor having a processor core 142. However, similar to processor 120, the processor 140 may be embodied as a multi-core processor having multiple processor cores 142 in other embodiments. Additionally, the load balancer 102 may include additional processors 140 having one or more processor cores 142.

The I/O subsystem 144 of the load balancer 102 may be embodied as circuitry and/or components to facilitate input/output operations with the processor 140 and/or other components of the load balancer 102. In some embodiments, the I/O subsystem 144 may be embodied as a memory controller hub (MCH or "northbridge"), an input/output controller hub (ICH or "southbridge"), and a firmware device. In such embodiments, the firmware device of the I/O subsystem 144 may be embodied as a memory device for storing Basic Input/Output System (BIOS) data and/or instructions and/or other information (e.g., a BIOS driver used during booting of the client computing device 104). However, in other embodiments, I/O subsystems having other configurations may be used. For example, in some embodiments, the I/O subsystem 144 may be embodied as a platform controller hub (PCH). In such embodiments, the memory controller hub (MCH) may be incorporated in or otherwise associated with the processor 140, and the processor 140 may communicate directly with the memory 146 (as shown by the hashed line in FIG. 1). Additionally, in other embodiments, the I/O subsystem 144 may form a portion of a system-on-a-chip (SoC) and be incorporated, along with the processor 140 and other components of the load balancer 102, on a single integrated circuit chip.

The processor 140 is communicatively coupled to the I/O subsystem 144 via a number of signal paths. These signal paths (and other signal paths illustrated in FIG. 1) may be embodied as any type of signal paths capable of facilitating communication between the components of the load balancer 102. For example, the signal paths may be embodied as any number of point-to-point links, wires, cables, light guides, printed circuit board traces, vias, bus, intervening devices, and/or the like.

The memory 146 of the load balancer 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 146 is communicatively coupled to the I/O subsystem 144 via a number of signal paths. Although only a single memory device 146 is illustrated in FIG. 1, the load balancer 102 may include additional memory devices in other embodiments. Various data and software may be stored in the memory 146. For example, one or more operating systems, applications, programs, libraries, and drivers that make up the software stack executed by the processor 140 may reside in memory 146 during execution.

The data storage 148 may be embodied as any type of device or devices configured for the short-term or long-term storage of data such as, for example, memory devices and circuits, memory cards, hard disk drives, solid-state drives, or other data storage devices. In the illustrative embodiment, the load balancer 102 maintains a session-server table 306 (see FIG. 3) stored in the data storage 148. As discussed in more detail below, the session-server table 306 cross-references, or otherwise correlates, session IDs to data servers 110, 112. That is, when a persistent session is established between one or more client computing devices 104, 106 and one or more data servers 110, 112, the load balancer updates the session-server table 306 with the session ID-to-data server pair(s) for the particular persistent session. Of course, the load balancer 102 may store, access, and/or maintain other data in the data storage 148 in other embodiments.

The communication circuitry 150 of the load balancer 102 may include any number of devices and circuitry for enabling communications between the load balancer 102 and the client computing devices 104, 106 over the network 108. The communication circuitry 150 may be configured to use any one or more communication protocols to effect such communication as discussed above with regard to the communication circuitry 130 of the client computing device 104. Additionally, in some embodiments, the load balancer 102 may also include one or more peripheral devices 152. Such peripheral devices 152 may include any number of additional input/output devices, interface devices, and/or other peripheral devices commonly associated with a server or computing device.

Similar to the load balancer 102, the data servers 110, 112 may be embodied as any type of server (e.g., a web server) or similar computing device capable of performing the functions described herein. As such, each data server 110, 112 may include components and features similar to the load balancer 102, such as a processor, I/O subsystem, memory, data storage, communication circuitry, and various peripheral devices, which are not illustrated in FIG. 1 for clarity of the present description. The data servers 110, 112 may be embodied as independent servers or computing devices separate from the load balancer 102 as shown in FIG. 1. Alternatively, in some embodiments, one or more of the data servers 110, 112 may be incorporated in, or otherwise form part of, the load balancer 102.

In the illustrative embodiment of FIG. 1, each data server 110, 112 maintains one or more databases 160 in which various server-side applications, client-based application data, and other data is stored. In cloud computing implementations, the data servers 110, 112 may execute various server-side applications corresponding to applications executed on the client computing devices 104, 106 (e.g., stand-alone or browser-based application). Additionally, the data servers 110, 112 may store data received from the client computing devices 104, 106 and/or data generated by the client- and server-side applications in the database 160. As discussed above, the data stored in the databases 160 may be periodically replicated across all data servers 110, 112 of the data center (and across data centers) to ensure each data server maintains a complete and current data set.

Figure 2:
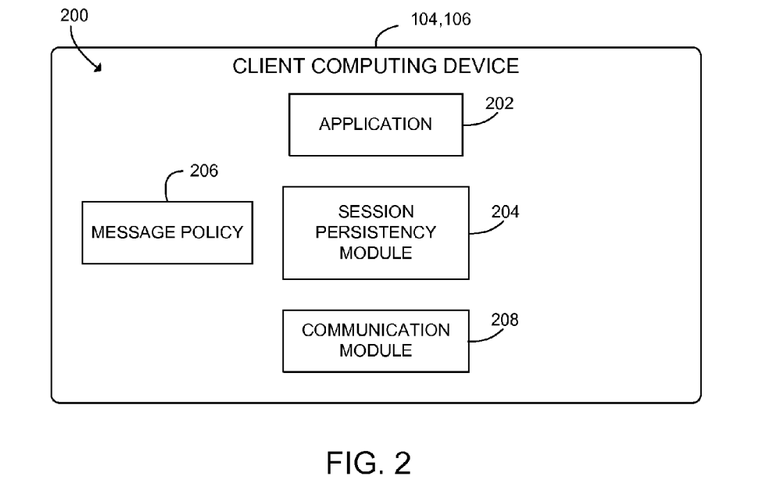
FIG. 2 is a simplified block diagram of at least one embodiment of an environment of a client computing device of the system of FIG. 1.

Referring now to FIG. 2, in one embodiment, the client computing devices 104, 106 establish an environment 200 during operation. The illustrative environment 200 includes one or more applications 202, a session persistency module 204, the message policy database 206, and a communication module 208. The applications 202 may be embodied as any type of software or firmware application configured to communicate with the data center 114 during execution. For example, in cloud computing implementations, the applications 202 may be embodied as browser-based applications and/or "thin" client-side applications configured to communicate with corresponding server-side applications executed on one or more data servers 110, 112. Alternatively, in other embodiments, the applications 202 may be embodied as stand-alone, full featured applications configured to communicate with the data center 114 to store data remotely.

The session persistency module 204 may be embodied as hardware, firmware, software, or a combination thereof. In some embodiments, the session persistency module 204 may be embodied as an application program interface incorporated in or otherwise interconnected with the application(s) 202. Alternatively, in other embodiments, the session persistency module 204 may be incorporated in the communication stack (e.g., TCP/IP stack) of the communication module 208. The session persistency module 204 is configured to identify persistent messages sent from the application(s) 202 and modify such messages to include a load balancer hint header, which identifies the location (and, in some embodiments, the length) of a session ID included in the message. The session persistency module 204 may identify the persistent messages by accessing the message policy 206, which may be stored in the data storage 128.

The message policy 206 includes rules and/or policies that are used by the session persistency module 204 to determine which outgoing messages sent from the application(s) 202 are persistent messages (i.e., initiate or belong to a client-server persistent session). For example, in some embodiments, the message policy 206 may provide rules or policies for identifying persistent messages based on the message's end points (e.g., the internet protocol (IP) address or media access control (MAC) address of load balancer 102 or data center 114 to which the message is directed), the type of message (e.g., the type of hypertext transfer protocol (HTTP) method used in the message, the type of Simple Object Access Protocol (SOAP) action used in the message, etc.), other data included in the HTTP or other protocol payload, and/or other data that may be used by the session persistency module 204 to identify those outgoing messages that should be considered persistent messages.

Once identified as a persistent message, the session persistency module 204 modifies the persistent message to include a load balancer hint header. As discussed in more detail below with regard to FIG. 4, the load balancer hint header includes a location identifier that identifies the location of a session ID within the message and a length identifier that identifies the length of the session ID. Additionally, in some embodiments, the load balancer hint header may include an action that identifies an action to be performed by the load balancer 102. After the persistent message has been modified to include the load balancer hint header, the persistent message is transmitted to the data center 114 over the network 108 via the communication module 208 using a suitable communication protocol as discussed above. Similar to the session persistency module 204, the communication module 208 may be embodied as hardware, firmware, software, or a combination thereof.

Figure 3:
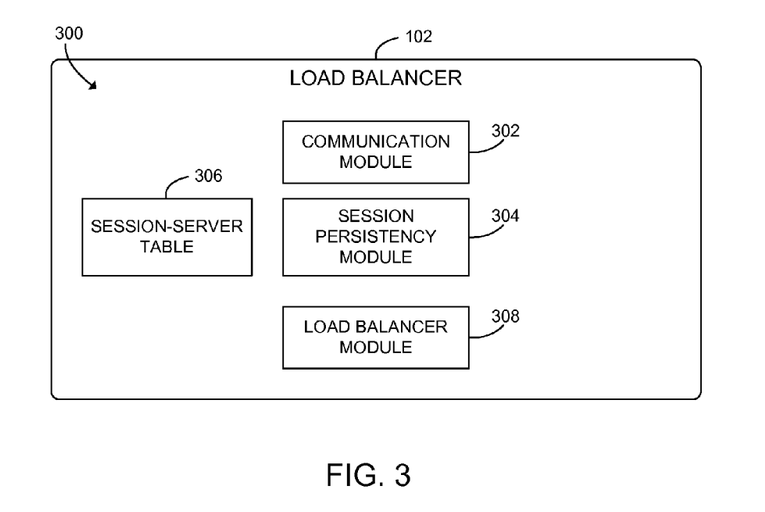
FIG. 3 is a simplified block diagram of at least one embodiment of an environment of a load balancer of the system of FIG. 1.

Referring now to FIG. 3, in one embodiment, the load balancer 102 may establish an environment 300 during operation. The illustrative environment 300 includes a communication module 302, a session persistency module 304, the session-server table or database 306, and a load balancer module 308. The communication module 302 may be embodied as hardware, firmware, software, or a combination thereof and is configured to receive the messages from the client computing devices 104, 106 over the network 108. The communication module 302 passes the received messages to the session persistency module 304 for analysis and handling.

Similar to the session persistency module 204, the session persistency module 304 may be embodied as hardware, firmware, software, or a combination thereof. The session persistency module 304 is configured to identify persistent messages from those messages received from the client computing device 104, 106. To do so, the session persistency module 304 determines whether the particular message includes a load balancer hint header. If so, the session persistency module 204 retrieves the session ID included in the persistent message based on data included in the load balancer hint header as discussed in more detail below. The retrieved session ID is compared to the session-server table 306 to determine which data server(s) 110, 112 to which that particular session ID has been assigned. The communication module 302 subsequently routes the persistent message to the identified data server(s) 110, 112. Alternatively, if the session ID is not located in the session-server table 306, the message is provided to the load balancer module 308, which selects one or more data servers 110, 112 to which to route the message based on, or otherwise using, a typical load balancing algorithm (e.g., based on the work load of the data servers 110, 112). The session persistency module 304 subsequently updates the session-server table 306 with the newly assigned session-server pair.

Figure 4:
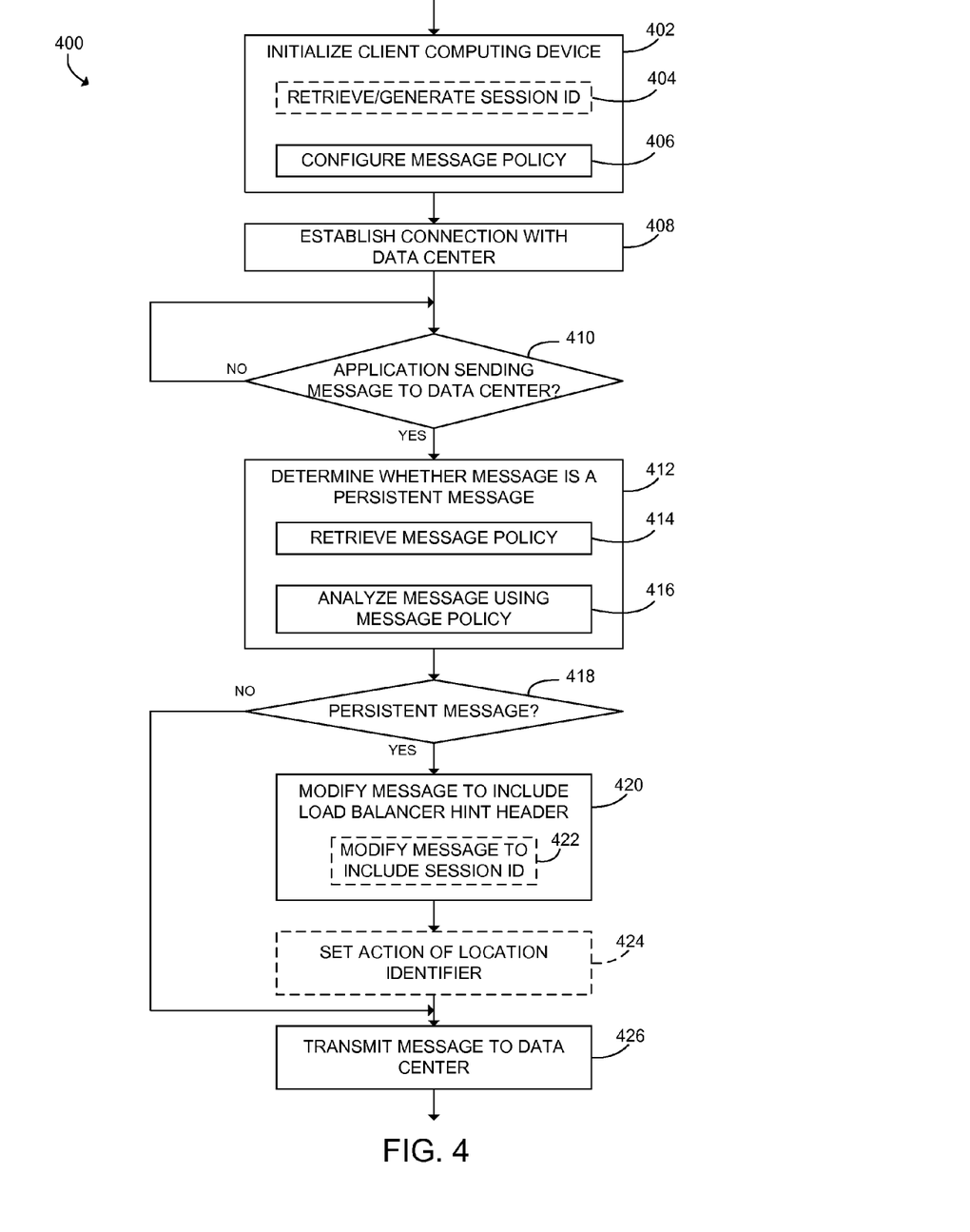
FIG. 4 is a simplified flow diagram of at least one embodiment of a method for generating a persistent message, which may be executed by the client computing device of FIG. 2.

Referring now to FIG. 4, in use, the client computing devices 104, 106 may execute a method 400 for generating a persistent message. The method 400 begins with block 402 in which the client computing device 104, 106 is initialized, which may include any suitable initialization process. In some embodiments, the client computing device 104, 106 may retrieve, or otherwise generate, the session ID in block 404, which may be embodied as any type of data that identifies a particular persistent session. For example, if the session ID has already been generated and assigned by the load balancer 102, the client computing device 104, 106 may retrieve the session ID in block 404. Alternatively, the session ID may be requested from the load balancer 102 by the client computing device 104, 106 or simply assigned by the load balancer to the first message associated with a new session. Further still, in some embodiments, the session ID may be generated by the client computing device 104. In such embodiments, the session ID may be embodied as a data word that uniquely identifies the client computing device 104, 106 from other client computing devices such as a media access control (MAC) address or a globally unique identifier (GUID). In such embodiments, the session ID may be assigned to, or otherwise associated with, the client computing device 104, 106 prior to execution of the method 400 and retrieved in block 404. In other embodiments, the session ID may be embodied as a data word or other data that is randomly generated in block 404 using a suitable random generator to produce a substantially unique identifier. In such embodiments, the session ID may uniquely identify a persistent session such that a single client computing device 104, 106 may maintain multiple persistent sessions.

In block 406, the client computing device 104, 106 may also configure the message policy 206. As discussed above, the message policy includes rules and/or policies that may be used by the session persistency module 204 of the client computing device 104, 106 to determine which outgoing messages are persistent messages. As such, the client computing device 104, 106 may establish, update, or otherwise maintain such rules and policies in block 406.

The client computing device 104, 106 subsequently establishes a connection with the data center 114 over the network 108 in block 408. In block 410, the session persistency module 204 of the client computing device 104, 106 determines whether the application(s) 202 executed on the client computing device 104, 106 is attempting to send a message to the data center 114. If so, the method 400 advances to block 412 in which the client computing device 104, 106 determines whether the outgoing message is a persistent message (i.e., a message belonging to a persistent session or a message that should initiate a persistent session). To do so, the session persistency module 204 retrieves the message policy 206 in block 414 and analyzes the outgoing message using the message policy in block 416. As discussed above, the rules and policy of the message policy 206 may be embodied as any type of rule or policy for determining whether the message is a persistent message such as, for example, rules or policies based on the message's end point, the type of message, or other data.

If the session persistency module 204 determines the message is a persistent message in block 418, the method 400 advances to block 420 in which the session persistency module 204 modifies the message to include a load balancer hint header. As discussed above, the load balancer hint header identifies the location within the message at which the session ID can be found. As such, the load balancer hint header allows the load balancer 102 to retrieve quickly the session ID without the necessity of scanning or analyzing the complete message. The load balancer hint header may be embodied as any type of data that identifies the location of the session ID within the message. For example, in embodiments in which HTTP messages are used, the load balancer hint header may have the form of:

LB-HINT:X,Y\r\n wherein "LB-HINT" is the header tag that identifies the header as a load balancer hint header, "X" is a location identifier that identifies the location of the session ID within the message, "Y" is a length identifier that identifies the length of the session ID, and "/r/n" are end tags that identify the end of the load balancer hint. Of course, it should be appreciated that the header tag may be embodied as any type of header tag that identifies load balancer hint header and need not be "LB-HINT" in other embodiments depending on, for example, the type of message. The location identifier may identify the location of the session ID using an absolute value (i.e., the exact location within the message) or a relative value (i.e., the location of the session ID within the message relative to the location of the load balancer hint). The location identifier may identify the location of the session ID using any suitable location metric such as a number of lines, bytes, characters, or the like. Similarly, the length identifier may identify the length of the session ID using any suitable metric such as the number of characters, bytes, or words of the session ID. In some embodiments, the session ID may not be inherently included in the message. In such embodiments, the session persistency module 204 may also modify the message to include the session ID in block 422 (either before or after the inclusion of the load balancer hint header.).

Additionally, in embodiments in which the system 100 includes multiple data centers 114 as shown in FIG. 7 or in which each data center 114 includes multiple load balancers, the load balancer hint header my include an action type that identifies an action to be performed by the load balancer 102. For example, in embodiments in which HTTP messages are used, the load balancer hint header may have the form of:

LB-HINT:X,Y;[action]\r\n wherein "action" defines the action type to be performed by the load balancer 102. The action type may be embodied as any type of identifier suitable for identifying the requested action. In some embodiments, the session persistency module 204 may choose from a set of predefined action types and set the requested action in the load balancer header in block 424. For example, in one particular embodiment, a "create" action type or a "search" action type may be used. In such embodiments, the "create" action type instructs the load balancer 102 that a new persistent session should be initiated using the current session. The "search" action type instructs the load balancer 102 that a persistent session already exists for the session ID included in the message and that the load balancer 102 should communicate with other load balancers to locate the persistent session should the current load balancer 102 have no record of that session (i.e., there is no session-server pair in the local session-server table 306). After the message has been modified as needed in blocks 420, 422, and/or 424, the communication module 208 transmits the modified message to the load balancer 102 in block 426.

Referring back to block 418, if the persistency module 204 determines that the message is not a persistent message, the method 400 advances to block 426. In block 426, the communication module 208 transmits the message to the load balancer 102 as normal. That is, the message is treated as a normal (non-persistent) message to be sent to the load balancer.

Figure 5:
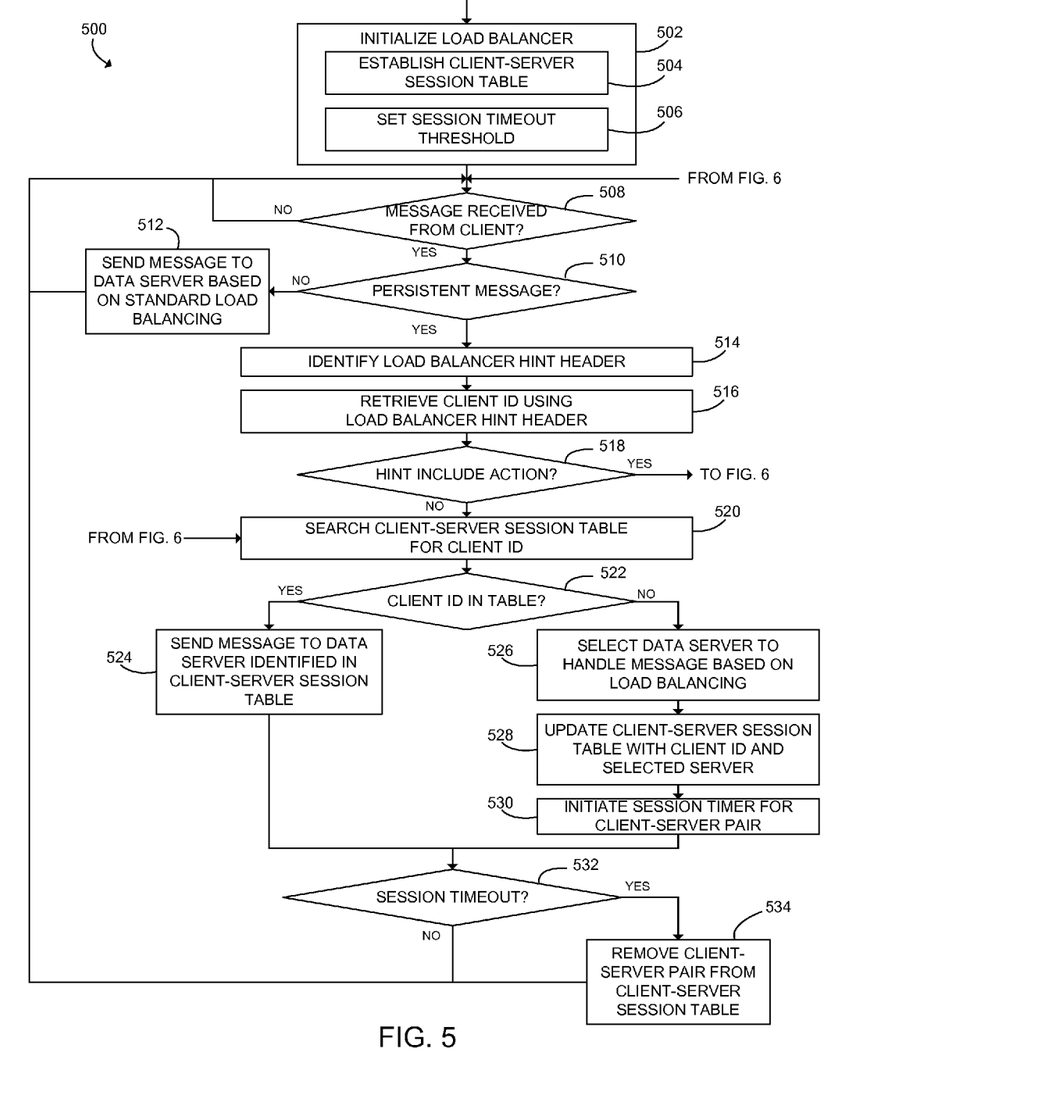
FIGS. 5 and 6 are simplified flow diagrams of at least one embodiment of a method for maintaining session persistency between the client computing device and one or more data servers, which may be executed by the load balancer of FIG. 1.
Figure 6:
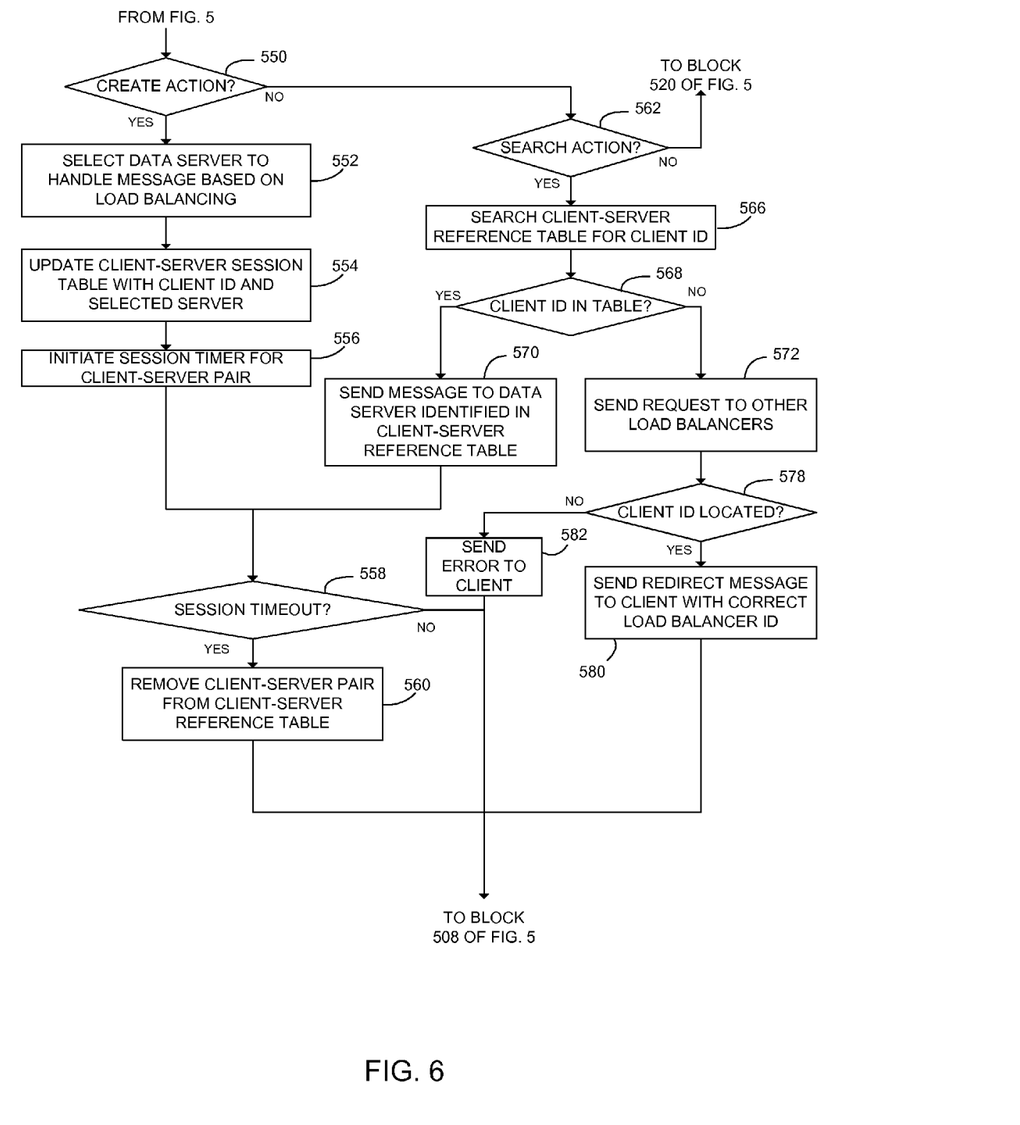

Referring now to FIGS. 5 and 6, in use, the load balancer 102 may execute a method 500 for maintaining session persistency between one or more client computing device 104, 106 and one or more data servers 110, 112. The method 500 begins with block 502 in which the load balancer is initialized, which may include any suitable initialization process. For example, in some embodiments, the load balancer 102 may establish, or otherwise maintain, the session-server table 306 in block 504. Additionally, in some embodiments, each persistent session is assigned a timeout threshold such that each persistent session lasts for only a predetermined or reference time period. In such embodiments, the session timeout threshold may be selected, determined, or otherwise set in block 506. In some embodiments, the magnitude of the session timeout threshold is selected to allow data replication across the data servers 110, 112 (i.e., the persistent session is maintained only long enough to ensure data replication across the data servers 110, 112).

After the load balancer 102 has been initialized, the load balancer 102 determines whether a message has been received from a client computing device 104, 106 in block 508. If so, the session persistency module 304 of the load balancer 102 determines whether the received message is a persistent message in block 510. To do so, the session persistency module 304 may determine whether the message includes a load balancer hint header. If the session persistency module 304 determines that the received message is not a persistent message (i.e., does not include a load balancer hint header), the method 500 advances to block 512 in which the load balancer 102 routes the received message to a data server 110, 112 that is selected by the load balancer module 308 using a typical load balancing algorithm.

If, however, the received message is determined to be a persistent message (i.e., the message includes a load balancer hint header), the session persistency module 304 of the load balancer 102 identifies the load balancer hint header in block 514. Subsequently, in block 516, the session persistency module 304 retrieves the session ID as a function of the load balancer hint header (i.e., using the data included in the load balancer hint header). For example, in embodiments in which the load balancer hint header includes a location identifier and a length identifier, the session persistency module 304 locates the session ID within the message using the location identifier and retrieves the session ID using the length identifier. As discussed above, the location identifier may identify the absolute or relative location of the session ID.

In block 518, the session persistency module 304 determines whether the load balancer hint head also includes an action type. If not, the method 500 advances to block 520 in which the session persistency module 304 searches the local session-server table 306 using the retrieved session ID to determine whether a persistent session for that session ID is active. If the session persistency module 304 locates the session ID in the session-server table 306 in block 522, the method 500 advances to block 524 in which the communication module 302 of the load balancer 102 routes the message to the data server(s) 110, 112 identified as paired with the session ID in the session-server table 306. Additionally, in some embodiments, the load balancer 102 may use data or criteria (e.g., load balancing, state of replication, etc.) in addition to the session ID to determine which one or more data servers 110, 112 to which to route the message. In block 532, the session persistency module 304 determines whether the timeout threshold has been reached for any persistent session included in the session-server table 306. If so, the method 500 advances to block 534 wherein the session-server pair for any timed-out persistent session is removed from the session-server table 306. If not, or after the session-server pair has been removed from the session-server table 306, the method 500 loops back to block 508 in which the load balancer 102 monitors for messages from the client computing devices 104, 106.

Referring back to block 522, if the session ID is not included in the session-server table 306, the method 500 advances to block 526 in which the load balancer module 308 of the load balancer 102 selects one or more data servers 110, 112 for the new persistent session (i.e., a data server(s) 110, 112 to receive messages from the client computing device 104, 106 for the new persistent session). As discussed above, the load balancer module 308 may use any suitable load balancing algorithm or technique to select the data server 110, 112. Once selected, the session persistency module 304 updates the session-server table 306 with the new session ID-server pair(s) using the selected data server(s) 110, 112 in block 528. In block 530, a session timer is initiated for the newly established persistent session (i.e., for the new session-server pair(s)). In some embodiments, the session timer is recorded in the session-server table 306 in association with the session-server pair(s) and may be embodied as, for example, the time at which the new persistent session was established. The method 500 subsequently advances to block 532 in which the session persistency module 304 determines whether the timeout threshold has been reached for any persistent session included in the session-server table 306 as discussed above. If so, the method 500 advances to block 534 wherein the session-server pair for any timed-out persistent session is removed from the session-server table 306. If not, or after the session-server pair has been removed from the session-server table 306, the method 500 loops back to block 508 in which the load balancer 102 monitors for messages from the client computing devices 104, 106.

Referring back to block 518, if the session persistency module 304 determines that the load balancer hint header does include an action type, the method 500 advances to block 550 (see FIG. 6). In block 550, the session persistency module 304 determines whether the action type is a "create" action. If so, the method 500 advances to blocks 552, 554, and 556 in which the load balancer module 308 selects one or more data servers 110, 112 for the new persistent session, updates the session-server table 306, and initiates a session timer for the newly established persistent session as discussed above with regard to blocks 526, 528, and 530. After the new persistent session has been established, the method 500 advances to block 558 in which the session persistency module 304 determines whether the timeout threshold has been reached for any persistent session included in the session-server table 306. If so, the method 500 advances to block 560 wherein the session-server pair(s) for any timed-out persistent session is removed from the session-server table 306. If not, or after the session-server pair has been removed from the session-server table 306, the method 500 subsequently loops back to block 508 in which the load balancer 102 monitors for messages from the client computing devices 104, 106.

Referring back to block 550, if the action type of the load balancer hint header is determined not to be a "create" action, the method 500 advances to block 462 in which the session persistency module 304 determines whether the action type is a "search" action. If not, the method 500 loops back to block 520 (see FIG. 5) in which the message is handled as a message having no action type. However, if the action type is determined to be a "search" action, the method 500 advances to block 566 in which the session persistency module 304 searches the local session-server table 306 using the retrieved session ID to determine whether a persistent session for that session ID is active as discussed above with regard to block 520. If the session persistency module 304 determines that the session ID is included in the local session-server table 306, the method advances to block 570 in which the communication module 302 of the load balancer 102 routes the message to the data server(s) 110, 112 identified as paired with the session ID in the local session-server table 306. The method 500 subsequently advances to block 558 in which the session persistency module 304 determines whether the timeout threshold has been reached for any persistent session included in the session-server table 306 as discussed above. If so, the method 500 advances to block 560 wherein the session-server pair(s) for any timed-out persistent session is removed from the session-server table 306. If not, or after the session-server pair has been removed from the session-server table 306, the method 500 subsequently loops back to block 508 in which the load balancer 102 monitors for messages from the client computing devices 104, 106.

Referring back to block 568, if the session persistency module 304 determines that the session ID is not included in the local session-server table 306 (i.e., the persistent session is not being maintained by the respective load balancer 102), the method 500 advances to block 572 in which the load balancer 102 sends a request to other load balancers within the data center 114 or within other data centers 114 of the system 100 (see FIG. 7). In so doing, the load balancer 102 requests the other load balancers to search their local session-server table 306 for the session ID to determine which of one or more of the other load balancers is maintaining that persistent session. Subsequently, in block 578, the load balancer 102 determines whether the session ID has been located by another load balancer (e.g., whether an affirmative response from the other load balancer was received by the load balancer 102). If so, in block 580, the load balancer 102 sends a redirect message to the client computing device 104, 106 providing identification data (e.g., an IP address) of the load balancer(s) maintaining the particular persistent session. However, if the session ID is not located, an error message is sent to the client computing device 104, 106 in block 582 and the method loops back to block 508 in which the load balancer 102 monitors for messages from the client computing devices 104, 106.

EXAMPLES

Illustrative examples of the devices, systems, and methods disclosed herein are provided below. An embodiment of the devices, systems, and methods may include any one or more, and any combination of, the examples described below.

In one example, a load balancer to balance workload from a plurality of client computing devices across a plurality of data servers may include a communication module to receive a message from a client computing device of the plurality of client computing devices and a session persistency module to provide a persistent session between one or more client computing devices and one or more data servers as a function of a load balancer hint header included in the message. The load balancer hint header may identify a location, within the message, of a session identifier that identifies the persistent session.

In an example, the session persistency module to retrieve the session identifier as a function of the load balancer hint header, compare the session identifier to a session-server table to identify at least one data server to receive the message, and transmit the message to the identified at least one data server. In an example, the session persistency module may remove the session identifier from the session-server table in response to expiration of a session timer associated with the persistent session between the one or more client computing devices and the identified at least one data server. In an example, the session persistency module may select, using a load balancing algorithm, a data server from the plurality of data servers in response to the session identifier not being included in the session-server table and transmit the message to the selected data server. In an example, the session persistency module may, in response to selecting the data server, initiate a session timer associated with the persistent session between the one or more client computing devices and the selected data server.

In an example, the load balancer hint header may include a location identifier that identifies the location, within the message, of the session identifier. In an example, the location identifier may include an offset value that identifies the location, within the message, of the session identifier relative to one of (i) a location of the load balancer hint header in the message or (ii) the beginning of the message. In an example, the load balancer hint header may further include a length identifier that identifies a length of the session identifier. In an example, the session persistency module may obtain the session identifier from the message as a function of the location identifier and the length identifier, compare the session identifier to a local session-server table to identify a data server to receive the message as a function of the session identifier, and transmit the message to the identified data server.

In an example, the load balancer hint header may include a location identifier that identifies the location within the message of the session identifier and an action type that indicates an action to be performed by the load balancer. In such an example, the session persistency module may perform one of a plurality of actions based on the action type included in the load balancer hint header. In an example, the session persistency module, in response to the load balancer hint header including a corresponding action type, may select, using a load balancing algorithm, a data server from the plurality of data servers to receive the message and transmit the message to the selected data server. In an example, the session persistency module may, in response to selecting the data server, initiate a session timer associated with the persistent session. In an example, the session persistency module, in response to the load balancer hint header including a corresponding action type, may determine whether the session identifier is included in a local session-server table and transmit, in response to determining that the session identifier is not included in the local session-server table, a request to at least one other load balancer to determine whether the session identifier is included in a session-server table managed by the other load balancer. In an example, the session persistency module may receive an acknowledgment from another load balancer that the session identifier is included in a session-server table managed by the other load balancer and transmit, in response to the acknowledgement, a redirect message to the client computing device that sent the message. The redirect message may include load balancer identification data that identifies the load balancer that manages the session-server table in which the session identifier is included. In an example, the session persistency module may receive a response message from the corresponding data server identified in the session-server table managed by the other load balancer to be associated with the session identifier and retransmit the response message to the client computing device that sent the message. In an example, the session persistency module, in response to determining that the session identifier is included in the local session-server table, may identify one or more data servers of the plurality of data servers from the local session-server table as a function of the session identifier and transmit the message to the identified one or more data servers.

In an example, the load balancer hint header may include a label that identifies the load balancer hint header, a location identifier that identifies the location within the message of the session identifier, a length identifier that identifies the length of the session identifier, and an action type that indicates an action to be performed by the load balancer. In an example, the load balancer hint header comprises a HyperText Markup Language header. In an example, the session identifier uniquely identifies a persistent session between the client computing device that sent the message and one of the data servers.

In another example, a client computing device to communicate with one or more data servers of a data center may include a session persistency module to modify a message to be sent from an application executing on the client computing device to the one or more data servers to include a load balancer hint header that identifies a location, within the message, of a session identifier that identifies a persistent session between the client computing device and the one or more data server. The client computing device may also include a communication module to transmit the modified message to a load balancer that manages the one or more data servers.

In an example, the load balancer hint header may include a location identifier that identifies the location, within the message, of the session identifier. In an example, the location identifier may include an offset value that identifies the location, within the message, of the session identifier relative to one of (i) a location of the load balancer hint header in the message or (ii) the beginning of the message. In an example, the load balancer hint header may further include a length identifier that identifies a length of the session identifier. In an example, the load balancer hint header may further include an action type that indicates an action to be performed by the load balancer. In an example, the session persistency module may determine the action to be performed by the load balancer and set the action type to indicate the action to be performed by the load balancer. In an example, the action type may indicate that the load balancer is to create a persistent session between the client computing device and the one or more data servers. In an example, the action type may indicate that the load balancer is to communicate with another load balancer to locate a corresponding data server with which the client computing device has a current persistent session.

In an example, the session persistency module may determine whether the message is a persistent message to be included in a persistent session between the client computing device and the one or more data servers based on a message policy stored on the client computing device. In an example, the message policy may identify persistent messages based on at least one of: a destination of the message, a Hyptertext Transfer Protocol method included in the message, and a Simple Object Access Protocol action included in the message. In an example, the session persistency module may generate the session identifier and further modify the message by including the session identifier. In an example, the session identifier may uniquely identify the client computing device from other computing devices communicating with the load balancer. In an example, the session identifier may uniquely identify a persistent session between the client computing device and the one or more data servers. In an example, the session identifier may uniquely identify a persistent session between the load balancer and the one or more data servers.

In another example, a method to provide a persistent session between a client computing device and a plurality of data servers may include receiving, with a load balancer, a message from the client computing device; determining, with the load balancer, a location of a session identifier within the message based on a load balancer hint header included in the message, the session identifier identifying the persistent session; comparing, with the load balancer, the session identifier to a session-server table managed by the load balancer to identify at least one data server of the plurality of data servers to receive the message; and transmitting the message from the load balancer to the identified at least one data server. In an example, the method may further include removing the session identifier from the session-server table in response to expiration of a session timer associated with the persistent session. In an example, the method may further include selecting, using a load balancing algorithm, a data server from the plurality of data servers in response to the session identifier not being included in the session-server table and transmitting the message to the selected data server. Additionally, in an example, the method may further include initiating, in response to selecting the data server, a session timer associated with the persistent session.

In an example, determining the location of the session identifier may include determining the location of the session identifier as a function of (i) a location identifier of the load balancer hint header that identifies the location, within the message, of the session identifier and (ii) a length identifier that identifies a length of the session identifier. In an example, determining the location of the session identifier as a function of the location identifier may include determining the location of the session identifier, within the message, as a function of the location identifier and the location of the load balancer hint header within the message.

In an example, the method may further include determining an action to be performed by the load balancer based on an action type included in the load balancer header, wherein the action type indicates the action to be performed by the load balancer. In an example, the method may further include, in response to determining a corresponding action based on the action type, (i) selecting, using a load balancing algorithm, a data server form the plurality of data servers to receive the message and (ii) transmitting the message from the load balancer to the selected data server. In an example, the method may further include, in response to determining a corresponding action based on the action type, (i) determining whether the session identifier is included in a local session-server table and (ii) transmitting, in response to determining that the session identifier is not included in the local session-server table, a request to at least one other load balancer to determine whether the session identifier is included in a session-server table managed by the other load balancer. In an example, the method may further include receiving an acknowledgment, in response to the request, from another load balancer that the session identifier is included in a session-server table managed by the other load balancer and transmitting, in response to the acknowledgement, a redirect message to the client computing device that sent the message, wherein the redirect message includes load balancer identification data that identifies the load balancer that manages the session-server table in which the session identifier is included. In an example, the method may further include receiving a response message, in response to the request, from the corresponding data server identified in the session-server table managed by the other load balancer to be associated with the session identifier and retransmitting the response message to the client computing device that sent the message.

In another example, a load balancer may include a processor and a memory having stored therein a plurality of instructions that when executed by the processor cause the load balancer to perform any of the methods described above. Additionally, in another example, one or more machine readable media may include a plurality of instructions stored thereon that in response to being executed result in a load balancer performing any of the methods described above.

In another example, a method for persistent session communication between a client computing device and a data server of a plurality of data servers may include modifying a message to be sent from an application executing on the client computing device to the data server to include a load balancer hint header that identifies a location, within the message, of a session identifier that identifies the persistent session and transmitting the modified message to a load balancer that manages the data server. In an example, modifying the message may include setting a location identifier of the load balancer hint header to identify the location, within the message, of the session identifier. In an example, modifying the message may include setting a location identifier of the load balancer hint header to identify the location, within the message, of the session identifier relative to one of (i) a location of the load balancer hint header in the message or (ii) the beginning of the message. In an example, modifying the message may include setting a length identifier of the load balancer hint header that identifies a length of the session identifier. In an example, modifying the message may include setting an action type of the load balancer hint header that indicates an action to be performed by the load balancer.

In an example, setting the action type may include setting the action type to indicate that the load balancer is to create a persistent session between the client computing device and the data server. In an example, setting the action type may include setting the action type to indicate that the load balancer is to communicate with another load balancer to locate a corresponding data server with which the client computing device has a current persistent session.

In an example, the method may further include determining whether the message is a persistent message to be included in a persistent session between the client computing device and the data server based on a message policy stored on the client computing device. In an example, determining whether the message is a persistent message may include determining whether the message is a persistent message based on at least one of: a destination of the message, a Hypertext Transfer Protocol method included in the message, and a Simple Object Access Protocol action included in the message. In an example, the method may further include generating the session identifier and further modifying the message by including the session identifier.

In another example, a client computing device may include a processor and a memory having stored therein a plurality of instructions that when executed by the processor cause the client computing device to perform any of the methods described above. Additionally, in another example, one or more machine readable media may include a plurality of instructions stored thereon that in response to being executed result in a client device performing any of the methods described above.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A load balancer to balance workload from a plurality of client computing devices across a plurality of data servers, the load balancer comprising:
one or more processors; and
one or more data storage devices having stored therein a plurality of instructions that, when executed by the one or more processors, cause the load balancer to:
receive a message from a client computing device of the plurality of client computing devices, wherein the message comprises a message header and a message body; and
provide a persistent session between one or more client computing devices and one or more data servers as a function of a load balancer hint header included in the message header of the message, wherein the load balancer hint header comprises an offset value that identifies, relative to (i) a location of the load balancer hint header or (ii) the beginning of the message, a location of a session identifier that is located within the message body of the message, and wherein the session identifier identifies the persistent session.

2. The load balancer of claim 1, wherein the plurality of instructions, when executed by the one or more processors, further cause the load balancer to:
retrieve the session identifier as a function of the load balancer hint header;
compare the session identifier to a session-server table to identify at least one data server to receive the message; and
transmit the message to the identified at least one data server.

3. The load balancer of claim 1, wherein the load balancer hint header further comprises a length identifier that identifies a length of the session identifier.

4. The load balancer of claim 1, wherein the load balancer hint header further comprises an action type that indicates an action to be performed by the load balancer, and
wherein the plurality of instructions, when executed by the one or more processors, further cause the load balancer to perform one of a plurality of actions based on the action type included in the load balancer hint header.

5. The load balancer of claim 4, wherein the plurality of instructions, when executed by the one or more processors, further cause the load balancer, in response to the load balancer hint header including a corresponding action type, to:
determine whether the session identifier is included in a local session-server table, and
transmit, in response to determining that the session identifier is not included in the local session-server table, a request to at least one other load balancer to determine whether the session identifier is included in a session-server table managed by the other load balancer.

6. The load balancer of claim 5, wherein the plurality of instructions, when executed by the one or more processors, further cause the load balancer to:
receive an acknowledgment from another load balancer that the session identifier is included in a session-server table managed by the other load balancer, and
transmit, in response to the acknowledgement, a redirect message to the client computing device that sent the message, wherein the redirect message includes load balancer identification data that identifies the load balancer that manages the session-server table in which the session identifier is included.

7. The load balancer of claim 5, wherein the plurality of instructions, when executed by the one or more processors, further cause the load balancer to:
receive a response message from the corresponding data server identified in the session-server table managed by the other load balancer to be associated with the session identifier; and
retransmit the response message to the client computing device that sent the message.

8. The load balancer of claim 1, wherein the load balancer hint header further comprises a label that identifies the load balancer hint header, the location identifier, a length identifier that identifies the length of the session identifier, and an action type that indicates an action to be performed by the load balancer.

9. A client computing device to communicate with one or more data servers of a data center, the client computing device comprising:
one or more processors; and one or more data storage devices having stored therein a plurality of instructions that, when executed by the one or more processors, cause the client computing device to:

modify a message to be sent from an application executing on the client computing device to the one or more data servers to include a load balancer hint header in a message header of the message, wherein the load balancer hint header comprises an offset value that identifies, relative to (i) a location of the load balancer hit header or (ii) the beginning of the message, a location of a session identifier that is located within the message body of the message, wherein the session identifier identifies the persistent session between the client computing device and the one or more data servers; and to transmit the modified message to a load balancer that manages the one or more data servers.

10. The client computing device of claim 9, wherein the load balancer hint header comprises a location identifier that identifies the location, within the message, of the session identifier.

11. The client computing device of claim 10, wherein the load balancer hint header further comprises a length identifier that identifies a length of the session identifier.

12. The client computing device of claim 11, wherein the load balancer hint header further comprises an action type that indicates an action to be performed by the load balancer.

13. The client computing device of claim 12, wherein the plurality of instructions, when executed by the one or more processors, further cause the load balancer to:

determine the action to be performed by the load balancer; and set the action type to indicate the action to be performed by the load balancer.

14. The client computing device of claim 12, wherein the action type indicates that the load balancer is to communicate with another load balancer to locate a corresponding data server with which the client computing device has a current persistent session.

15. A method to provide a persistent session between a client computing device and a plurality of data servers, the method comprising:

receiving, with a load balancer, a message from the client computing device, wherein the message includes a message header and a message body;

determining, with the load balancer, a location of a session identifier based on a load balancer hint header included in the message header of the message, wherein the load balancer hint header comprises an offset value that identifies, relative to (i) a location of the load balancer hint header or (ii) the beginning of the message, a location of the session identifier within the message body of the message, and wherein the session identifier identifies the persistent session;

comparing, with the load balancer, the session identifier to a session-server table managed by the load balancer to identify at least one data server of the plurality of data servers to receive the message; and transmitting the message from the load balancer to the identified at least one data server.

16. The method of claim 15, wherein determining the location of the session identifier comprises determining the location of the session identifier, within the message, as a function of the offset value and the location of the load balancer hint header within the message.

17. The method of claim 15, further comprising determining an action to be performed by the load balancer based on an action type included in the load balancer header, wherein the action type indicates the action to be performed by the load balancer.

18. The method of claim 17, further comprising, in response to determining a corresponding action based on the action type, (i) determining whether the session identifier is included in a local session-server table and (ii) transmitting, in response to determining that the session identifier is not included in the local session-server table, a request to at least one other load balancer to determine whether the session identifier is included in a session-server table managed by the other load balancer.

19. The method of claim 18, further comprising:

receiving an acknowledgment, in response to the request, from another load balancer that the session identifier is included in a session-server table managed by the other load balancer, and transmitting, in response to the acknowledgement, a redirect message to the client computing device that sent the message, wherein the redirect message includes load balancer identification data that identifies the load balancer that manages the session-server table in which the session identifier is included.

20. The method of claim 18, further comprising:

receiving a response message, in response to the request, from the corresponding data server identified in the session-server table managed by the other load balancer to be associated with the session identifier; and retransmitting the response message to the client computing device that sent the message.

21. A method for persistent session communication between a client computing device and a data server of a plurality of data servers, the method comprising:

modifying a message to be sent from an application executing on the client computing device to the data server to include a load balancer hint header in a message header of the message, wherein the load balancer hint header comprises an offset value that identifies, relative to (i) a location of the load balancer hint header or (ii) the beginning of the message, a location of a session identifier that identifies the persistent session, wherein the session identifier is located within the message body of the message; and transmitting the modified message to a load balancer that manages the data server.

22. The method of claim 21, wherein modifying the message comprises setting the offset value of the load balancer hint header to identify the location, within the message, of the session identifier.

23. The method of claim 22, wherein modifying the message comprises setting a length identifier of the load balancer hint header that identifies a length of the session identifier.

24. The method of claim 23, wherein modifying the message comprises setting an action type of the load balancer hint header that indicates an action to be performed by the load balancer.

25. The method of claim 24, wherein setting the action type comprises setting the action type to indicate that the load balancer is to create a persistent session between the client computing device and the data server.

26. The method of claim 24, wherein setting the action type comprises setting the action type to indicate that the load balancer is to communicate with another load balancer to locate a corresponding data server with which the client computing device has a current persistent session.

27. One or more non-transitory, machine-readable storage media comprising a plurality of instructions stored thereon that, when executed, cause a load balancer to:
- receive a message from the client computing device, wherein the message includes a message header and a message body;
- determine a location of a session identifier based on a load balancer hint header included in the message header of the message, wherein the load balancer hint header comprises an offset value that identifies, relative to (i) a location of the load balancer hint header or (ii) the beginning of the message, a location of the session identifier within the message body of the message, and wherein the session identifier identifies the persistent session;
- comparing, with the load balancer, the session identifier to a session-server table managed by the load balancer to identify at least one data server of the plurality of data servers to receive the message; and
- transmitting the message from the load balancer to the identified at least one data server.

28. The one or more non-transitory, machine-readable storage media of claim 27, wherein to determine the location of the session identifier comprises to determine the location of the session identifier, within the message, as a function of the offset value and the location of the load balancer hint header within the message.

29. One or more non-transitory, machine-readable storage media comprising a plurality of instructions stored thereon that, when executed, cause a client computing device to:
- modify a message to be sent from an application executing on the client computing device to the data server to include a load balancer hint header in a message header of the message, wherein the load balancer hint header comprises an offset value that identifies, relative to (i) a location of the load balancer hint header or (ii) the beginning of the message, a location of a session identifier that identifies the persistent session, wherein the session identifier is located within the message body of the message; and
- transmit the modified message to a load balancer that manages the data server.

30. The one or more non-transitory, machine-readable storage media of claim 29, wherein to modify the message comprises to set the offset value of the load balancer hint header to identify the location, within the message, of the session identifier.

* * * * *